Sept. 11, 1956   A. K. KWASIEBORSKI ET AL   2,762,937
ELECTRICAL CONVERTING CIRCUIT ARRANGEMENTS
Filed Jan. 8, 1953                        2 Sheets-Sheet 1

Inventors:
Andrzej K. Kwasieborski
Peter Maurice Wright
Attorneys:
Baldwin & Wight United States Patent Office 2,762,937
Patented Sept. 11, 1956

2,762,937

ELECTRICAL CONVERTING CIRCUIT ARRANGEMENTS

Andrzej Kamal Kwasieborski, Chelmsford, and Peter Maurice Wright, Great Waltham, Chelmsford, England, assignors to Marconi's Wireless Telegraph Company Limited, London, England, a company of Great Britain Application January 8, 1953, Serial No. 330,240

Claims priority, application Great Britain January 15, 1952

6 Claims. (Cl. 307—108)

This invention relates to electrical converting circuit arrangements suitable for use for H. T. supply for electron discharge devices and has for its object to provide improved means whereby an alternating mains or similar source with alternating or ripple components may be used to provide H. T. supply without requiring expensive and elaborate smoothing arrangements. The invention is applicable in all cases where the load to be supplied from the converting circuit arrangement is intermittent in nature. An important but by no means exclusive application of the invention is for the supply of anode potential to a magnetron oscillator employed in a frequency modulated continuous wave radar system operating by Doppler effect.

Great difficulties have been experienced hitherto in obtaining from A. C. mains or other sources containing alternating or ripple components, a supply which is suitable for satisfactory use as anode potential and in arrangements in which a high degree of freedom from ripple is required, elaborate and expensive smoothing means have usually had to be provided hitherto. For example in frequency modulated (FM) and other continuous wave (C. W.) radar systems it is very important that there shall be no unwanted or spurious frequency modulation of the transmitted waves for if such modulation occurs false beat notes will be produced in the receiver of the system and false indications given. A common source of such unwanted modulation is ripple or like fluctuation in the power supply to the transmitting magnetron or other oscillator and hitherto elaborate and expensive smoothing means have been provided to avoid this. Recently developed FM and C. W. radar systems—for example that described in the British patent specification No. 592,749—employ the principle of what may be termed "duty cycle" working, both transmitter and receiver being switched on and off synchronously at a desired rate and for periods such that the "on" periods are longer than the echo time of the target, the necessary frequency modulation of the transmitter being carried out in the "on" periods. The present invention when applied to such radar systems operating with a "duty cycle" enables the onerous requirements of such systems as respects H. T. smoothing to be satisfied without resorting to expensive smoothing means.

According to this invention in its broadest aspect an electrical converting circuit arrangement adapted to be fed from a source containing alternating or ripple components comprises a condenser, means for intermittently connecting said condenser to said source to be charged thereby and means for intermittently connecting said condenser to the load to supply current thereto in the intervals between the charging periods.

The periods of connection of the condenser to the source are preferably synchronized with the main alternating or ripple component in the source or at a submultiple of said main alternating or ripple component and must be so synchronized if the supply from said source is A. C. or unsmoothed D. C. or contains a large ripple component.

Preferably also a current regulator is provided in series with the load fed from the condenser. It may be constructed and arranged to maintain the current through the load substantially constant and of chosen value or, by using as the said regulator a device capable of impedance variation at a sufficient rate by the action of a controlling signal, it may be used also as a modulator.

The switching may be accomplished by ordinary electromechanical switches or electronic switching may be resorted to. In the latter case the electronic switching is preferably effected by suitable pulses applied to a grid of a valve operating as a switch and the same valve (or an additional valve) may, if required, be arranged to act as a current regulator, and, if required, as a modulator e. g. by applying a modulating signal to a control grid which may (or may not) be the same grid as that to which the pulses are applied.

The invention is illustrated in the accompanying diagrammatic drawings which show several embodiments thereof and in which:

Fig. 1 schematically shows one form of circuit arrangement embodying our invention;

Figure 3:
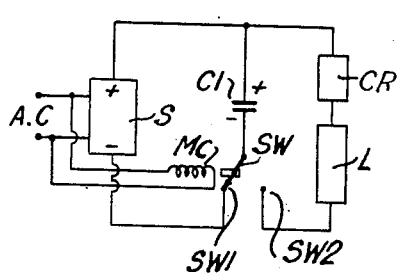
Fig. 3 shows our invention embodied in an electromechanical switching system.

Referring first to Fig. 3 which shows one simple embodiment, a source of voltage, for example an A. C. mains supply source or (as illustrated) a source S of unsmoothed rectified voltage derived from alternating current mains A. C. is connected at its positive terminal to one side of a condenser C1 and at its negative to one of the fixed contacts SW1 of a two-way switch SW the operation of which is synchronized with the mains frequency. The positive terminal of the source is also connected, either directly or through a regulator to one terminal of a load circuit L the other terminal of which is connected to the remaining fixed contact SW2 of the two-way switch. The armature of the switch is connected to the remaining terminal of the condenser—the negative one. The switch armature is oscillated between the two contacts in synchronism with the mains by means of a polarized relay represented in simple schematic manner by the coil MC. This relay is polarized because, if it were not, it would operate the switch at twice the mains frequency whereas if (as in the present case) the source S supplies either A. C. or unsmoothed D. C. or D. C. with a large ripple component, the switch must be synchronized with the mains frequency or a sub-multiple thereof. When the armature is on contact SW1 the condenser C1 is charged while when it is moved over to the contact SW2, the already charged condenser discharges (to an extent determined by the design details) through the load L. During such discharge the potential supplied to the load will, of course, be free from any alternating or ripple components in the source.

In many cases, for example in most "duty cycle" radar systems, it is important that the voltage to which the condenser is charged shall not vary from one switching cycle to the next and this requirement is satisfied when the switching cycle is synchronized (as is the case with the polarized relay arrangement of Fig. 3) with the mains frequency or an integral sub-multiple thereof in a suitable predetermined phase.

As the condenser C1 discharges the voltage across it, of course, decreases, but by choosing a condenser of suitable size this effect may be made as small as desired. Alternatively a current regulator represented by the block CR—e. g. a pentode valve—may be connected in series with the load as shown so as to maintain the discharge current substantially constant at a chosen value despite reduction of condenser voltage as the discharge takes place. If the load is a "linear circuit" the current regulator will also stabilize the voltage across the load. If the load impedance varies the voltage across it will also do so but the load current will be substantially unaffected. This type of arrangement with a regulator is particularly suitable where the load is a magnetron for, as is well known, with a magnetron, current regulation will result in a much better defined operating point and therefore much better stabilized frequency than will voltage of the same percentage regulation.

Current regulators of almost any type known per se may be employed at CR—e. g. carbon piles—but the preferred form consists of an electron discharge device or chain of such devices. With such current regulators the value at which the load current is stabilized can be adjusted at will merely by applying a suitable adjustable voltage to a control grid and the same valve or chain of valves can also be used as a switching device for alternating the condenser connections by applying suitable pulsations to a control grid. Also by applying a modulating signal potential to a control grid which may, but need not, be one to which switching pulsations are also applied modulation may be effected. It is preferred to use positive going pulses for switching for then the current to the load is "off" in the absence of applied pulses. Clearly, if modulation is to be effected it must be applied when the current is "on" and therefore, if modulation and switching is to be effected on the same grid the modulating signal must be superimposed on positive half cycles of the pulses. Thus recurrent pulses of rectangular wave form with a superimposed signal wave of desired frequency, the pulses being of mains frequency or a sub-multiple thereof may be applied to a suitably connected pentode to make it operate as a switch and as a modulator and also as a current regulator.

Figure 4:
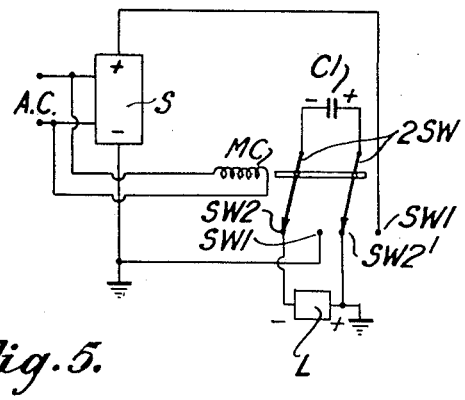
Fig. 4 shows a modified form of the circuit arrangement of Fig. 3.

In the modification shown in Fig. 4 similar two-way switches are employed with the condenser C1 connected between the armatures thereof. The two armatures are moved in synchroniism where mechanical switching is employed they preferably and as shown form parts of the same switch structure 2SW—each oscillating between two fixed contacts SW1, SW2 or SW1', SW2'. The source S is connected between the contacts SW1, SW1', each of which co-operates with a different armature and the load circuit L is connected between the remaining two fixed contacts SW2, SW2'. The switch armatures are oscillated together as indicated e. g. by the coil MC so that the condenser is alternatively connected across the source and across the load. With this arrangement the negative side of the source and the positive side of the load may be earthed if desired as is shown in Fig. 4.

Figure 5:
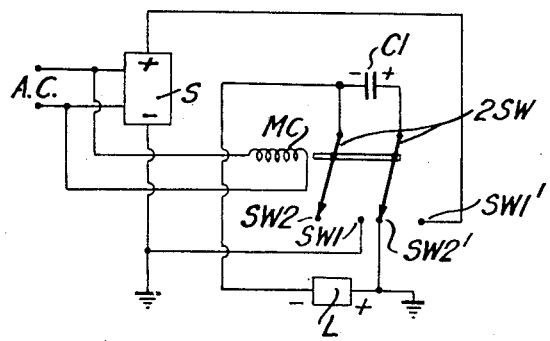
Fig. 5 shows another modified form of the circuit of Fig. 3.

Fig. 5 shows a modification of Fig. 4. Here earth is again applied on the positive side of the load L and on the negative side of the source S but the negative side of the load is directly connected to the negative side of the condenser C1 instead of, as in Fig. 4, to the contact SW2. With this arrangement as will be apparent the load is short circuited when it is not connected to the condenser.

Figure 6:
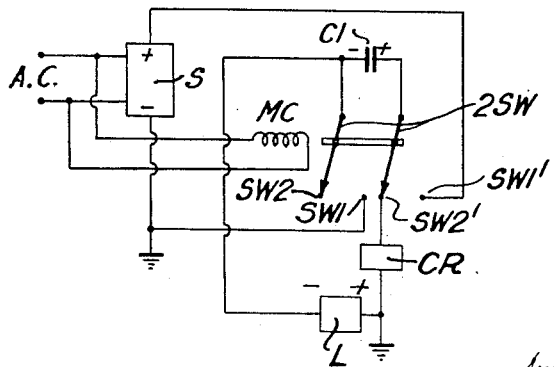
Fig. 6 shows a further form of the circuit of Fig. 3 embodying our invention.

In a further modification shown in Fig. 6 the arrangement of Fig. 5 is varied by providing a regulator CR in series with the load L and on the positive side thereof one earth connection being now provided between said regulator and said load instead of, as in Fig. 5, being applied at the fixed contact SW2'. In this arrangement also the load is short circuited in idle periods.

Figure 1:
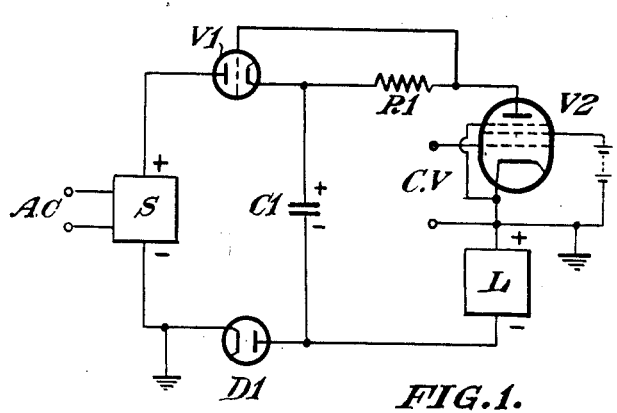

As already stated switching may be effected electronically instead of by electro-mechanical means. One circuit arrangement of this kind is shown diagrammatically in Fig. 1. Here the source S, which is supplied from A. C. mains connected at AC, has its positive side connected to the anode of a valve V1 and its negative side connected to earth and the cathode of a diode D1. The condenser C1 is connected between the cathode of the valve V1 and the anode of the diode D1 and the former point is connected through a resistance R1 to the anode of a suitable valve V2 (shown as a pentode) whose cathode is earthed and connected through the load L to the negative side of the condenser. In Fig. 1 the screen grid of the valve V2 which provides current regulation is indicated as supplied with suitable potential from a battery and the suppressor grid is connected to the cathode. The anode of the valve V2 is directly connected to the control grid of the valve V1.

A suitable signal, for example, a rectangular positive going pulse of mains (or sub-multiple) frequency and having a superimposed signal wave thereon, is applied at CV to the control grid of the valve V2 which is thereby made alternately conducting and non-conducting. As will be seen when valve V2 is in the non-conducting state the valve V1 will be conductive for no current flows through the resistance R1. If the voltage across the condenser C1 is less than that across the source S the anode of the diode will be positive to ground and the diode will conduct so that the condenser is charged through the valve V1 on the one side and the diode D1 on the other. When the valve V2 becomes conductive the condenser partly discharges and the discharge current flowing through resistance R1 makes the grid of the valve V1 sufficiently negative to cut off the said valve while the discharge current through the load makes the anode of the diode D1 negative to ground and accordingly the charging circuit is broken on the diode side also. It will be seen that the power dissipated in the valve V1 is smaller than that consumed by the load because when the said valve is conducting its grid is at cathode potential and the voltage across it is at a minimum. The valve V1 can, therefore, be quite a small one as far as loading is concerned but it must nevertheless be able to withstand almost the full votlage of the source when no current is being drawn through it. For this reason the use of a triode for the valve V1 is not in practice convenient since most available triodes having a voltage rating high enough for the purpose here in question are larger than is required from the point of view of power dissipation. A pentode or tetrode is therefore preferred for the valve V1 and Fig. 2 shows an arrangement using such a valve at V1.

Figure 2:
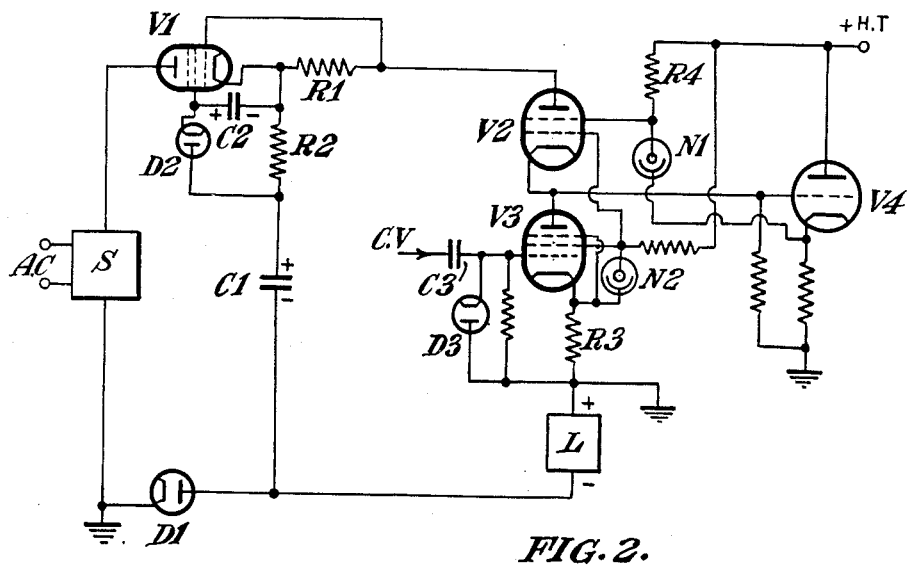
Fig. 2 shows a circuit arrangement for another embodiment of our invention.

The method of supplying voltage to the screen grid of the valve V1 in Fig. 2 will be noted. The screen grid cannot conveniently be supplied in the normal conventional manner because the potential at the cathode of this valve changes suddenly by a large amount (in practice it may be many kilovolts) twice every switching cycle and any stray capacity between the said cathode and earth will limit the frequency response of the system. In Fig. 2 therefore the screen grid of the valve V1 is supplied by means of a circuit including the resistance R2, which is in series with the condenser C1, and a condenser C2 and a diode D2 connected as shown. When the condenser C1 discharges the potential produced by the current through the resistance R2 charges the condenser C2 through the diode D2. As already explained valve V1 is then cut off and draws no screen current. When the valve V1 is conducting the condenser C1 is charged from the source and the potential produced across resistance R2 by the current through it makes the diode D2 non-conducting while the condenser C2 partly discharges into the screen grid.

A further modification, also embodied in Fig. 2, consists in the use of two valves V2 and V3 in series to provide current regulation. This, of course, gives better current regulation than is obtainable by one valve alone. Valve V2 is shown as a tetrode and V3 as a pentode. In practice valve V3 is preferably a pentode in order to provide high dynamic impedance and valve V2 may be either a tetrode or a pentode.

In the arrangement of Fig. 2 the control grid potential of the valve V3 is varied through condenser C3 by applying a suitable control signal at CV to achieve three purposes (1) to switch the current regulator (consisting of the two valves V2 and V3 in series) on and off and (2) to control the mean value of the current flowing through the regulator and the load in the periods of discharge of the condenser C1 and (3) to effect modulation. The first and second of these purposes requires a rectangular wave of suitable amplitude and the third a suitable signal of small amplitude and any desired frequency up to several hundred kc./s. superimposed on the positive crests of the pulses and the control signal applied at CV may therefore be, as already described, a series of rectangular pulses of mains (or sub-multiple) frequency with a modulating signal wave superimposed on the positive half cycles of the pulses. In Fig. 2 N1 and N2 are voltage regulators of the glow discharge type. It can be ensured that the load current shall be "off" when no control signal is applied by so choosing the value of the resistance R3 in series with valves V2 and V3 that the current flowing from the glow tube N2 causes across the resistance R3 a potential sufficient to cut off the valve V3 when its control grid is at ground potential. The condenser C3 in conjunction with the diode D3 acts as a D. C. restorer circuit whereby the potential of the control grid of the valve V3 is made to vary substantially from ground potential to one corresponding to the full peak-to-peak amplitude of the control signal applied at CV.

The method of supplying potential to the screen grid of the valve V2 is also noteworthy. If the current regulator is to operate efficiently the dynamic impedance of the valve V2 must be high as also must be that of the valve V3. The obtaining of a high dynamic impedance for the valve V2 involves that the potential between screen grid and cathode of this valve must be constant and this is assured by connecting the glow discharge tube N1 via a cathode follower valve V4 to the cathode of the valve V2. The cathode of the valve V4 and therefore the screen grid of the valve V2 will substantially follow any change in the potential of the control grid of the said valve V4 and therefore of the cathode of valve V2. The potential of the screen grid of the valve V3 is stabilized by the glow discharge tube N2 which is directly connected between screen grid and cathode, a form of connection which cannot be used for the tube N1 in association with the valve V2 because of the shunt effect which would then be provided by the tube N1, the resistance R4, and the H. T. source across the high dynamic impedance of the valve V2.

In the case where an alternating mains supply is used and its frequency is lower than that of the desired switching frequency, the "source" S may consist of a rectifier and a reservoir condenser—preferably one of a capacity at least as large as that of the switched condenser (C1 of the drawings) and, if necessary, a step-up transformer or other voltage multiplying circuit. This will nearly always be found to give adequate smoothing. In arrangements in which (a) the switched condenser (C1) is so arranged that it cannot discharge through the source and (b) the voltage across the source increases to its peak value (with the required polarity) at least once while the mains condenser is connected to the said source and each time it is so connected, the rectifier and the reservoir condenser may be omitted altogether. Clearly the circuit of Fig. 2 satisfies the above condition (a) since current cannot flow from anode to cathode in either the valve V1 or the diode D1. As will be apparent condition (b) will be satisfied if the controlling voltage effecting the switching or its equivalent is locked to the mains frequency in a suitable phase or if the mains frequency is more than twice that of the controlling voltage.

We claim:

1. An electrical converting circuit arrangement for supplying D. C. potential to an intermittent load, said circuit arrangement being adapted to be fed from a source containing a main alternating component and comprising a condenser, the charge in which supplies power to said load, means for intermittently and alternately connecting said condenser to said source to be charged thereby, and to said load, in synchronism with the alternating component in the said source, so that said condenser is connected to said source to be charged thereby, in the intervals between the periods when said load is connected to said condenser, and means operable automatically for isolating said source from said load during the periods that said condenser is connected to said load.

2. An electrical converting circuit arrangement for supplying D. C. potential to an intermittent load, said circuit arrangement being adapted to be fed from a source containing a main alternating component and comprising a condenser the charge in which supplies power to said load, means for intermittently and alternately connecting said condenser to said source to be charged thereby and to said load in synchronism with a sub-multiple of said main alternating component in the said source so that said condenser is connected to said source to be charged thereby in the intervals between the periods when said load is connected to said condenser, and means operable automatically for isolating said source from said load during the periods that said condenser is connected to said load.

3. An electrical converting circuit arrangement as set forth in claim 1 wherein a current regulator arrangement is provided to maintain the current through the load substantially constant and of chosen value, said regulator comprising at least one thermionic valve connected in series to said load, means to apply the switching voltage to said regulator arrangement so as thereby to electronically switch electronically intermittently and alternately said condenser to said load and to said source.

4. An electrical converting circuit arrangement as set forth in claim 2 wherein a current regulator arrangement is provided to maintain the current through the load substantially constant and of chosen value, said regulator comprising at least one thermionic value connected in series to said load, means to apply the switching voltage to said regulator arrangement so as thereby to switch electronically and intermittently said condenser to said load and to said source.

5. An electrical converting circuit arrangement as set forth in claim 1 wherein electronic switching of the load circuit is effected by pulses applied to the grid of a regulator valve, whereby said regulator valve is rendered alternately conductive and non-conductive at the pulse frequency, and in which said means comprises a diode for switching the charging circuit of said condenser alternately with the discharge circuit.

6. An electrical converting circuit arrangement as set forth in claim 2 wherein electronic switching of the load circuit is effected by pulses applied to the grid of a regulator valve, whereby said regulator valve is rendered alternately conductive and non-conductive at the pulse frequency, and in which said means comprises a diode for switching the charging circuit of said condenser alternately with the discharge circuit.

References Cited in the file of this patent

UNITED STATES PATENTS

| | | |
|---|---|---|
| 2,465,407 | Varela | Mar. 29, 1949 |
| 2,474,580 | Hiehle | June 28, 1949 |
| 2,541,066 | Jaynes | Feb. 13, 1951 |
| 2,579,525 | Varela | Dec. 25, 1951 |
| 2,584,954 | Williams | Feb. 5, 1952 |

FOREIGN PATENTS

| | | |
|---|---|---|
| 548,192 | Great Britain | Sept. 30, 1942 |